United States Patent
Pavlin et al.

(10) Patent No.: US 6,709,588 B2
(45) Date of Patent: Mar. 23, 2004

(54) FILTER FOR INTERNAL COMBUSTION ENGINE FUELS

(75) Inventors: Jaroslav Pavlin, Freiberg (DE); Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/051,385

(22) Filed: Jan. 22, 2002

(65) Prior Publication Data

US 2002/0108897 A1 Aug. 15, 2002

Related U.S. Application Data

(63) Continuation of application No. PCT/EP00/04295, filed on May 12, 2000.

(30) Foreign Application Priority Data

Jul. 22, 1999 (DE) .......................... 199 34 378

(51) Int. Cl.[7] .................. B01D 35/16; B01D 35/34
(52) U.S. Cl. .............. 210/248; 210/299; 210/428; 210/436; 210/438; 210/450; 210/454; 210/458
(58) Field of Search ............... 210/248, 299, 210/433.1, 436, 437, 438, 440, 441, 442, 450, 457, 458, 472, 194, 428, 454; 123/514

(56) References Cited

U.S. PATENT DOCUMENTS

| | | | | |
|---|---|---|---|---|
| 4,036,755 A | * | 7/1977 | Dahm et al. | 210/168 |
| 5,098,559 A | * | 3/1992 | Mack et al. | 210/130 |
| 5,698,097 A | * | 12/1997 | Gebert et al. | 210/248 |
| 5,718,825 A | | 2/1998 | Greive et al. | |
| 5,922,196 A | | 7/1999 | Baumann | |

FOREIGN PATENT DOCUMENTS

| | | | | |
|---|---|---|---|---|
| DE | 9115839.7 | 5/1992 | | |
| DE | 4330840 | 2/1995 | | |
| DE | 4430341 | 3/1995 | | |
| DE | 4344586 | 6/1995 | | |
| DE | 4344588 | 6/1995 | | |
| DE | 19519352 | 11/1996 | | |
| DE | 19602082 | 7/1997 | | |
| DE | 19618166 | 11/1997 | | |
| DE | 19740268 | 3/1998 | | |
| DE | 19716085 | 10/1998 | | |
| EP | 0858825 | 8/1998 | | |
| GB | 2309176 A | * | 7/1997 | F02M/37/10 |

\* cited by examiner

Primary Examiner—Matthew O. Savage
(74) Attorney, Agent, or Firm—Crowell & Moring LLP

(57) ABSTRACT

A filter for filtering liquids, especially fuel, which includes a concentric housing, an unfiltered liquid inlet, and filtered fluid outlet, and a backflow member. A concentric filter element, with a dirt collecting chamber in the lowermost part thereof, is disposed in the housing, which is closed with a cover. The housing also contains a riser pipe having a return bore hole in the uppermost part thereof, as well as a return pipe. An intermediate pipe, which is sealingly closed by the cover, is disposed above the riser pipe, and the filter element is removably attached to the intermediate pipe.

10 Claims, 2 Drawing Sheets

FILTER FOR INTERNAL COMBUSTION ENGINE FUELS

CROSS REFERENCE TO RELATED APPLICATIONS

This application is a continuation of international application no. PCT/EP00/04295, filed May 12, 2000, designating the United States of America, the entire disclosure of which is incorporated herein by reference. Priority is claimed based on Federal Republic of Germany patent application no. DE 199 34 378.0, filed Jul. 22, 1999.

BACKGROUND OF THE INVENTION

This invention relates to a filter for liquids, particularly fuel. Such a filter is known, for instance, from DE 43 44 586 A1. This filter comprises a housing having a raw fluid inlet and a purified fluid outlet. A suitable filter element is arranged inside the housing. The prior art filter element furthermore has a collecting cup for dirt and foreign fluids.

A drawback of this system is that when the filter element is replaced, the collecting cup or collecting chamber has to be emptied and cleaned. In addition, a plurality of components is required for effective filtering of the liquids.

SUMMARY OF THE INVENTION

It is an object of the invention to provide a liquid filter which avoids or overcomes the aforementioned drawbacks.

Another object of the invention is to provide a liquid filter which is simple in design and achieves high filter performance with few components.

A further object of the invention is to provide a liquid filter which is easy to service.

These and other objects have been achieved in accordance with the present invention by providing a filter for liquids comprising a concentric housing, an unfiltered liquid inlet, a filtered liquid outlet, and a return pipe, wherein a concentric filter element is arranged inside the housing, the housing is sealed with a cover, the housing contains a riser pipe having a return bore in an uppermost part thereof as well as a return pipe, an intermediate pipe that is securely connected to the cover extends above the riser pipe, the filter element is removably arranged on the intermediate pipe, and the filter element has a dirt collecting chamber in a lowermost part thereof.

A significant advantage of the invention is that a riser pipe is provided within the filter housing. Said riser pipe is permanently connected with the housing. Inside the housing there is a return pipe through which on the one hand air can escape when the filter is being ventilated and on the other hand the raw fluid can flow back into the tank. The return pipe is provided with a small bore in the geodesically upper part thereof and is open toward the raw fluid area. An intermediate pipe extends above the riser pipe. Said intermediate pipe is securely latched to the cover and in the geodesically lower part is sealingly connected with the riser pipe. This means that the purified liquid initially rises and then flows through outlet bores into a riser pipe channel and from there reaches the purified liquid outlet. The filter element, which is removably arranged on the intermediate pipe, has a dirt collecting chamber in the geodesically lower part thereof. Said chamber retains any foreign liquid and any dirt particles. When the filter element is replaced, the foreign liquid is simultaneously removed from the filter element.

In accordance with a further embodiment of the invention, a water collecting chamber is provided on the filter element in the geodesically lower part thereof. Its capacity is selected such that the amount of water collected between two service intervals can be stored.

According to a still further embodiment of the invention, the water collecting chamber or dirt collecting chamber is provided with a radially outwardly extending stripper. This stripper contacts the interior wall of the housing and thereby effectively prevents dirt from being deposited in the lower part of the housing. When the filter element is replaced, said water collecting chamber brushes upwardly along the housing wall and removes any dirt particles adhering thereto toward the exterior.

In yet another embodiment of the invention, a valve is arranged in the lower part of the housing. When the housing is open, i.e., when a filter element is being removed, this valve connects the raw fluid area with the return flow area so that the raw fluid can escape from the filter system.

A still further embodiment of the invention comprises an arrangement of support ribs on the cover of the system. These support ribs, which are arranged radially or concentrically, serve to situate the filter element in its correct position. A profile gasket provides the seal between cover and housing. Said profile gasket has a bevel facing the end face of the housing, while the end face of the housing is provided with a counter bevel. One advantage of this sealing principle is that it does not cause any losses through leakage even if the fluid pressure is high.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
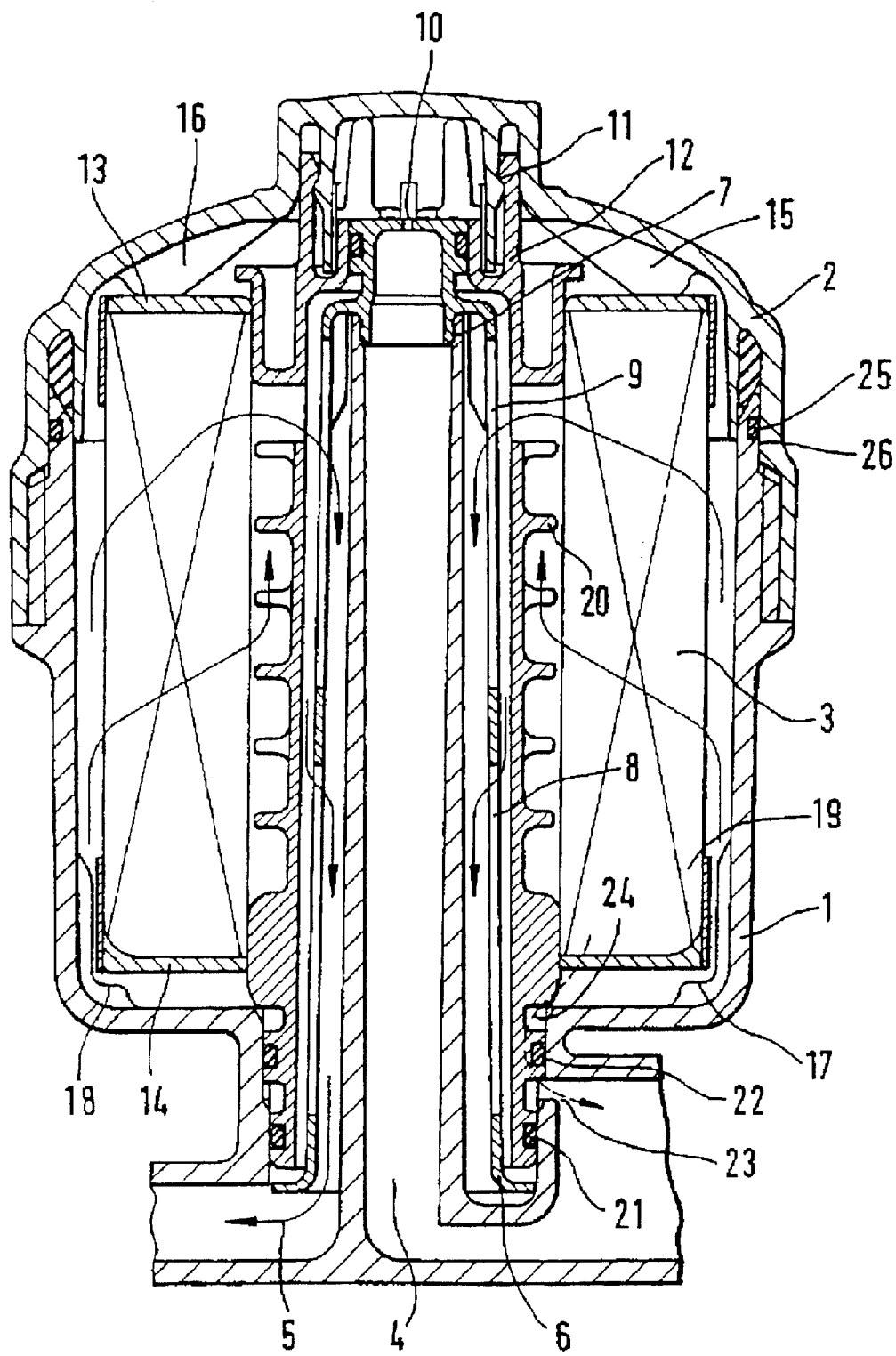
FIG. 1 is a sectional view of a filter for liquids according to the invention.

FIG. 1 shows a filter comprising a housing 1, which is substantially concentric and is sealed with a cover 2 in the upper part. Inside the housing there is a filter element 3. Housing 1, in the central area, has a return pipe 4 and a purified liquid outlet 5. A riser pipe 6 is provided concentrically to the return pipe 4. The upper part of said riser pipe is connected with return pipe 4 by means of a snap connection 7. The riser pipe 6 has a plurality of openings 8, 9 through which the purified liquid can flow into the interior and reach the purified liquid outlet 5. At its geodesically upper end the riser pipe 6 is provided with a ventilation bore 10. When the filter is being filled, air escapes through this ventilation bore 10 so that the filter can be rapidly filled with fuel.

During operation of the filter, a small amount of fuel flows into the return pipe through this ventilation bore which thus acts as a liquid bypass.

A concentric intermediate pipe 12 is connected to cover 2 by a snap-on connection 11. This snap-on connection is not detached when the filter element is being serviced. The filter element 3 is located on the intermediate pipe. The upper and lower areas of the filter element are provided with sealing end disks 13, 14, which radially seal the filter element relative to the intermediate pipe 12 and thus seal the raw fluid side from the purified fluid side in the upper and lower area of the filter element.

Correct positioning of the filter element 3 is achieved by supporting ribs 15, 16, 17, 18. In its geodesically lower part, filter element 3 is equipped with a dirt and water collecting chamber 19. This chamber is comprised, for instance, of a cylindrical foil that is wrapped around the filter element 3 and is connected with the sealing end disk 14. To eliminate the need to pay attention to the position of the non-woven fabric or the position of the dirt collecting chamber when the filter element is being installed, the filter element has a dirt collecting chamber at its opposite end as well. Thus, the position of the dirt collecting chamber, i.e., the position of the filter element, is irrelevant.

The intermediate pipe 12 is provided with a plurality of ribs 20, which support the filter element and prevent it from collapsing when the pressure differential between the raw fluid side and the purified fluid side is very high. In the lower area of the intermediate pipe there are two sealing points 21, 22. The raw fluid return is located between these two sealing points. If the cover together with the intermediate pipe 12 is pulled upwardly, i.e., if it is opened, the intermediate pipe clears the discharge channel 23 and the raw fluid can drain as indicated by the broken line arrow 24.

At the same time, when the cover of the housing is opened, air can flow in from the top so that the liquid can drain out of the filter system. When the filter element is removed from the housing, the liquid is drained completely and the filter element can be taken out without any loss of liquid. The metal-free filter element 3 is exchanged by pulling it off the intermediate pipe 12 and by placing a new filter element thereon. Other steps such as cleaning a container or emptying fluid and the like are not required.

An O-ring 25 provided on the housing initially prevents fluid from escaping from between the cover and the housing when cover 2 is opened. This O-ring 25 initially slides along a sealing surface 26. Only when the intermediate pipe has cleared discharge duct 23 because the cover has been moved upwardly, a gap opens in the upper part between cover 2 and housing 1 to allow air to flow in.

Figure 2:
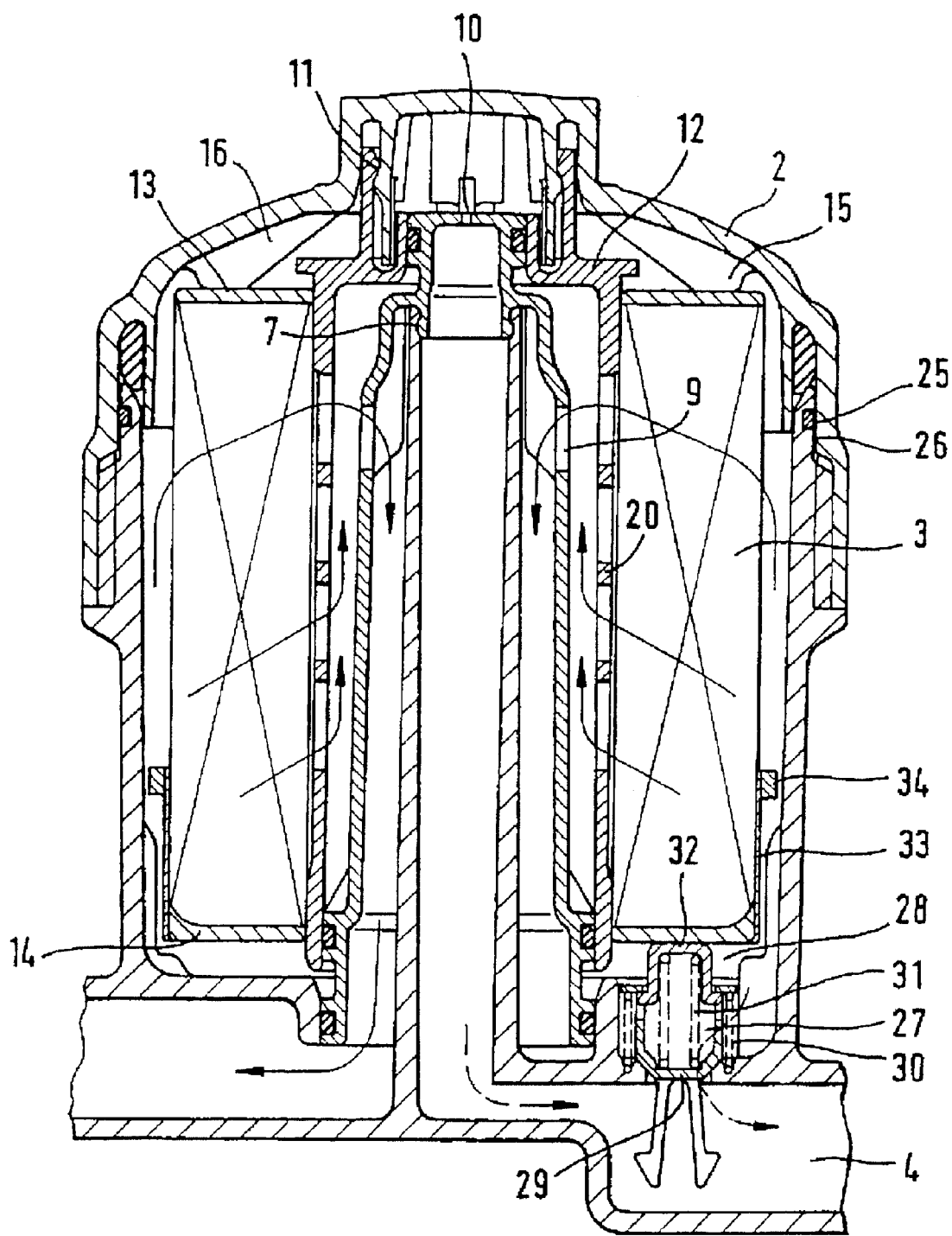
FIG. 2 is a sectional view of an alternative variant filter for liquids according to the invention.

FIG. 2 shows a variant of a filter for liquid or fuel. Identical parts are provided with identical reference numbers. An opening 9 is provided only in the upper part of the riser pipe 6. This has the effect that the purified liquid in principle has to flow upwardly so that the filter is uniformly loaded with dirt particles.

Another difference compared to the filter system described in FIG. 1 is that a floor drain valve 27 is provided in the floor of the housing. If a filter element 3 is installed in the housing its end disk 14 pushes the floor drain valve into its closed position and thereby prevents the liquid from draining out of the raw fluid area 28 into the return pipe 4.

When the filter element is removed, the floor drain valve opens the connection between the raw fluid side and the return pipe so that the liquid can drain. The floor drain valve essentially comprises a support 29, which simultaneously forms the valve disk on housing 1, as well as a first compression spring 30 and a second compression spring 31, which is provided as a tolerance compensation spring. Contact with the sealing end disk 13 is affected by means of a valve cap 32.

A water collecting chamber 33 is provided on filter element 3. This chamber is comprised, for example, of an elastic foil, which is sealingly connected to the end disk of the filter element. It is also possible to provide a stripper 34 to ensure that dirt particles along the wall of housing 1 are simultaneously discharged as the filter element is removed. It is of course also possible to combine the elastic foil with the stripper 34. This combination results in a particularly simple but effective configuration of the filter element.

The foregoing description and examples have been set forth merely to illustrate the invention and are not intended to be limiting. Since modifications of the described embodiments incorporating the spirit and substance of the invention may occur to persons skilled in the art, invention should be construed broadly to include all variations falling within the scope of the appended claims and equivalents thereof.

What is claimed is:

1. A filter for liquids comprising a housing, an unfiltered liquid inlet, and a filtered liquid outlet, wherein a filter element is arranged inside the housing, the housing is sealed with a cover, the housing contains a riser pipe having a return bore in an uppermost part thereof as well as a return pipe disposed within the riser pipe, an intermediate pipe is disposed around the riser pipe and extends above the riser pipe, the intermediate pipe is securely connected to the cover so that removal of the cover from the housing removes the intermediate pipe together with the cover, the filter element is removably arranged on the intermediate pipe, and the filter element has a dirt or water collecting chamber in a lowermost part thereof.

2. A filter according to claim 1, wherein the water or dirt collecting chamber is provided with a radially outwardly extending stripper that contacts an interior wall of the housing.

3. A filter according to claim 1, wherein the intermediate pipe is removably connected to the riser pipe.

4. A filter according to claim 1, wherein a drain valve is provided between an unfiltered liquid area on an upstream side of the filter element and a return area in fluid communication with the return pipe, said drain valve providing a connection between the unfiltered liquid and return areas and allowing liquid contained in the filter to drain out when the filter is opened.

5. A filter according to claim 1, wherein the cover is joined to the housing by a threaded connection, a profile seal with a bevel facing an end face of the housing is provided between the cover and housing, said end face of the housing has a counter bevel, and an additional seal in the form of an O-ring is provided to prevent liquid from escaping when the filter is opened.

6. A filter according to claim 5, when the cover is being removed, the O-ring initially slides along a sealing surface, but when the intermediate pipe clears a discharge duct, the O-ring becomes disengaged from the sealing surface.

7. A filter according to claim 1, wherein the return pipe is connected to the housing, and the removal of the cover and intermediate pipe from the housing does not remove the return pipe.

8. A filter according to claim 1, wherein the riser pipe has a plurality of openings through which filtered liquid flows.

9. A filter according to claim 8, wherein filtered liquid flows through the openings of the riser pipe and then through a gap between the riser pipe and return pipe before existing through the filtered liquid outlet.

10. A filter according to claim 1, wherein the filter element has a dirt or water collecting chamber in an uppermost part thereof.

\* \* \* \* \*